INVENTORS
SANG Y. WHANG
EDWARD BLECKNER, JR
BURTON J. WEISS
PAUL E. PAYNE
BY Browne, Schuyler & Beveridge
ATTORNEYS INVENTORS
SANG Y. WHANG
EDWARD BLECKNER, JR.
BURTON J. WEISS
PAUL E. PAYNE
BY Browne, Schuyler & Beveridge
ATTORNEYS 3,453,552
INTERCEPT CORRECTOR AND PHASE SHIFTER DEVICE Sang Y. Whang, Miami, Edward Bleckner, Jr., Fort Lauderdale, Burton J. Weiss, North Miami Beach, and Paul E. Payne, Fort Lauderdale, Fla., assignors to Milgo Electronic Corporation, a corporation of Florida Filed May 27, 1965, Ser. No. 459,276
Int. Cl. H03k *5/18, 3/53;* H03b *3/04*
U.S. Cl. 328—155 3 Claims

ABSTRACT OF THE DISCLOSURE

This invention provides an electronic device to correct the output phase relations for each frequency component of a composite electric signal in a line or network and operates to shift in predetermined amount the phase angle of the signal for each frequency component wherein all frequencies of interest are shifted in phase by the amount required to correct the axis intercept position to compensate for phase displacements within the network.

When a complex electrical signal is transmitted through electric filters and/or a transmission medium, usually the signal becomes distorted. In a linear network this distortion is caused either by unequal amplitude characteristics or by improper phase characteristics, both of which may occur together in the same system. In order to overcome the amplitude distortion, an amplitude equalizer is used to equalize the amplitude characteristics throughout the frequency range of interest. In general, an amplitude equalizer introduces its own phase characteristic which will be added to the existing transmission phase distortion characteristic. These composite phase characteristics may then be equalized by means of all-pass sections which pass all frequencies, but in different phase relationships, as described in Patent No. 3,122,716. An amplitude equalizer as herein used refers to a compensator for amplitude distortions introduced in a telephone or similar network, as illustrated in Patent No. 2,914,738, while a phase equalizer corrects for phase distortions incident to signal processing in the network.

It has been the practice in correcting phase characteristics of a network to correct the envelope delay characteristics of a network to correct the envelope delay characteristic, i.e., the derivative of the phase characteristic $d\theta/d\omega$. In most transmission line systems the phase characteristic is rather difficult to measure, but the envelope delay characteristic is easily measured by means of conventional delay measuring equipment. Using either a variable delay equalizer, or a fixed delay equalizer, one can equalize the envelope delay of a system in such a manner as to have a constant envelope delay throughout the frequency range of interest. The constant envelope delay produces a linear phase characteristic. However, depending upon the system, the linear phase characteristic appears as a necessary condition to avoid distortion, but not a sufficient condition to assure elimination of phase distortions, sometimes called delay distortions.

It has been found that for a distortionless phase characteristic in a network, the extrapolation of a linear phase characteristic curve to the intersection at 0 cycles on the ordinate axis becomes an important factor in determining whether or not the signal will be distorted. A detailed description of this type of distortion and the requirement for satisfactorily correcting a signal is given in U.S. Patent No. 3,122,716, issued Feb. 25, 1964. In order to eliminate phase distortions in accordance with that patent, two requirements must be met. One is that the phase-frequency characteristic must be linear within the bandwidth of the system. The second requirement, which is usually ignored, is that the intersection of the linear phase characteristic at the ordinate axis should be at 0° or an integral multiple of 180°, i.e., 0°, ±180°, ±360°, etc. While a number of devices are available to correct (or make constant) the envelope delay characteristic of a system, usually including means for measuring the envelope delay, there has been no means of assuring that the equalized phase characteristic has proper intersection at the ordinate.

It is a primary object of this invention to provide means for adding any desirable constant phase angle to all the incoming frequency components in the range of interest in such a manner that a linear phase-frequency characteristic could be displaced vertically to provide the desired intercept with the ordinate.

Another object is to provide means for adding a corrective phase angle to a signal component at each frequency in a desired passband or range, which phase angle is alike for all frequencies in that range.

A further object is to provide means for translating a phase-frequency characteristic curve linearly to a displaced position.

Still another object is to provide means for translating a linear phase-frequency characteristic to a parallel position wherein the extrapolated intercept at the zero frequency axis is at 0° phase position or removed therefrom by an integral multiple of 180°.

Further objects and advantages will become apparent from the following description taken in conjunction with the figures in which.

Figure 1:
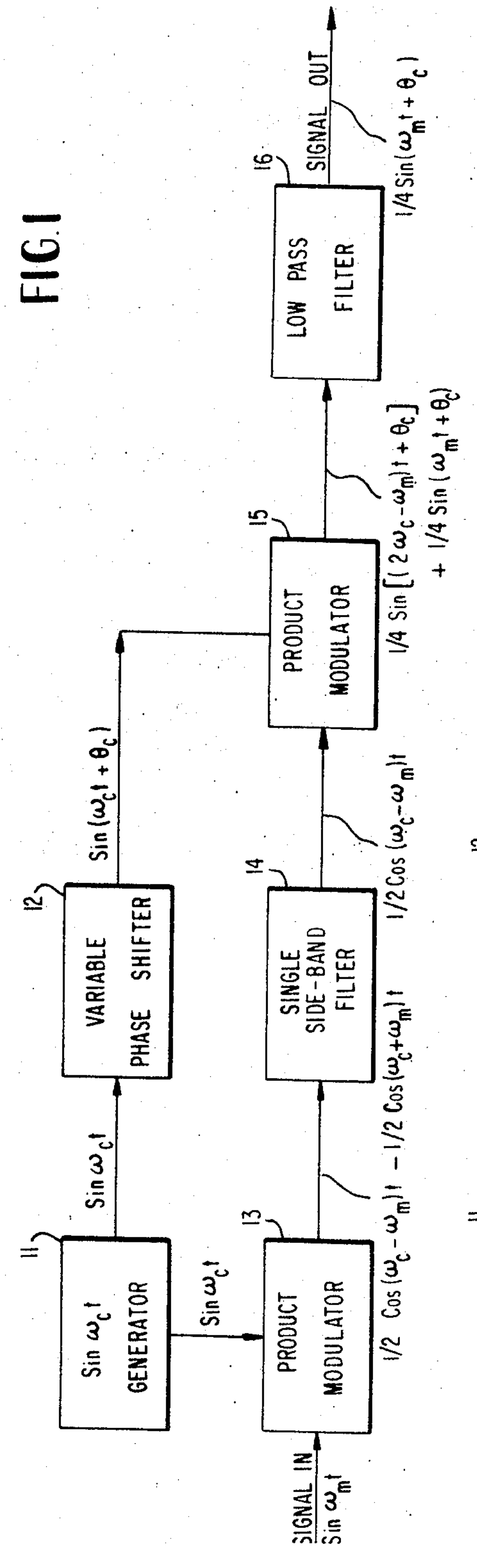
FIG. 1 is a simplified block diagram illustrating the basic mode of operation of the invention.

In FIG. 1 a complex input signal $\omega_m t$ is to be processed. For this purpose a wave having a primary component $\sin \omega_c t$ generated by generator 11 is modulated by the incoming signal (including a component $\sin \omega_m t$) by means of a conventional product modulator 13, or by other means such as a heterodyne circuit, or the like. The output of the modulator has two frequency components of interest, namely, an upper sideband and a lower sideband: $\sin \omega_m t \times \sin \omega_c t = \frac{1}{2} \cos (\omega_c - \omega_m)t - \frac{1}{2} \cos (\omega_c + \omega_m)t$. If generator 11 produces a square wave output including a frequency $\omega_c$, harmonics of $\sin \omega_c t$ will also be present, but these may be removed by filtering. The single sideband filter 14 selects one of the two sidebands, and is illustratively designed to filter out the upper sideband and pass only the lower sideband, $\frac{1}{2} \cos (\omega_c - \omega_m)t$. The carrier wave, $\sin \omega_c t$, is phase shifted $\theta_c$ degrees by variable phase shifter 12 and this phase shifted carrier, $\sin (\omega_c t + \theta_c)$, is multiplied by the output of the single sideband filter through product modulator 15, or the like to provide at least the products hereinafter noted, others being filtered out. Phase shifter 12 is a variable delay network of phase shift type, or may be of any other convenient type. For example, it may be a digital delay network, so long as it can be used to vary the delay up to at least one-half cycle of the frequency $\omega_c$, which delay is applied to add the same $\theta_c$ to all frequencies of the output at 16.

Modulator 15 has in its output two components, one at approximately twice the carrier frequency, and one which is the lower information frequency sideband, according to the following expression:

$$\sin(\omega_c t+\theta_c)\times\tfrac{1}{2}\cos(\omega_c-\omega_m)t = \tfrac{1}{4}\sin[(2\omega_c-\omega_m)t+\theta_c]+\tfrac{1}{4}\sin(\omega_m+\theta_c)$$

Low-pass filter 16 filters out the higher frequency component and passes the original incoming signal frequency $\omega_m$ with added phase angle $\theta_c$. Note, the $\theta_c$ added to this signal frequency is the same $\theta_c$ that is added to the carrier by means of variable phase shifter 12, and it is independent of the modulator frequency $\omega_m$.

Two filters shown in the FIG. 1 block diagram are assumed to be ideal filters, that is, filters which have no phase shift. However, in practice, all filters introduce their own phase characteristics which are added to the incoming signal. It is possible to measure the phase shift due to these filters by setting the variable phase shifter for a $\theta_c=0°$ and measuring the phase characteristic of the device itself apart from the phase shift introduced at 12. Compensation must then be provided to give a linear phase characteristic or constant envelope delay characteristic.

Figure 2:
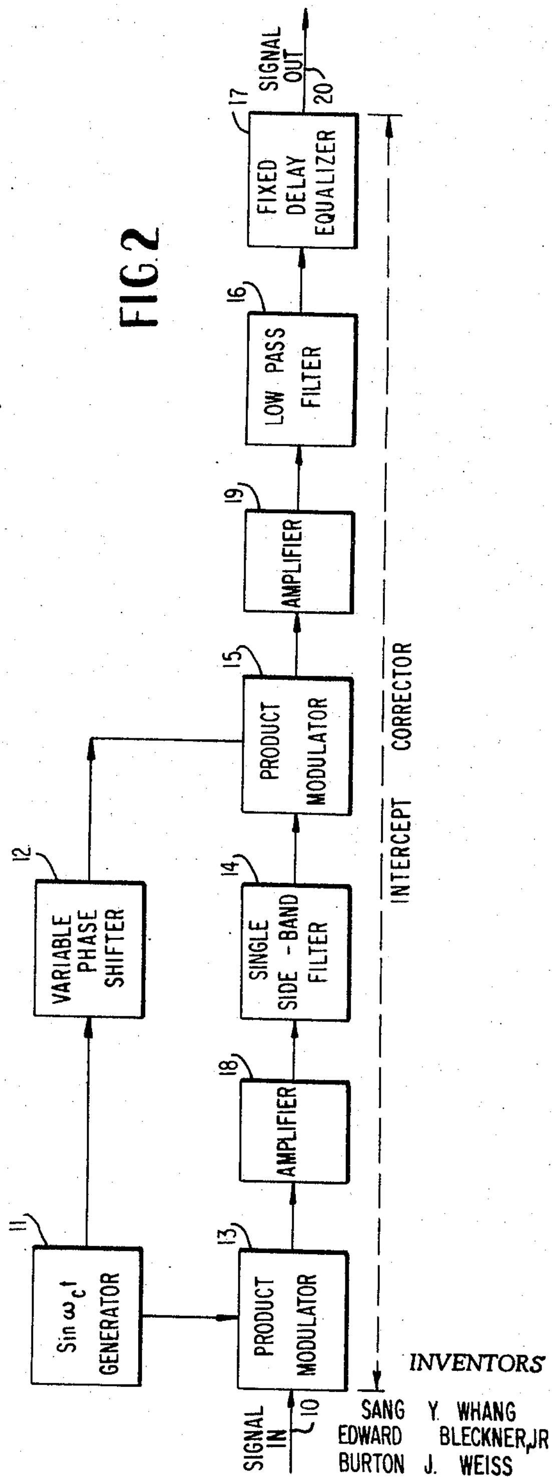
FIG. 2 is a modified block diagram for an actual system.

In FIG. 2, the fixed delay equalizer 17 has a phase characteristic designed to complement the phase characteristic of the two filters 14 and 16 so that the overall device has a linear phase characteristic within the range of interest. Of course, if the filters 14 and 16 are of linear phase type, the fixed delay equalizer may be omitted. Also, in FIG. 2, amplifiers 18 and 19 are added to adequately drive the two filters and to provide ampilitude compensation for filter losses. If these amplifiers have any nonlinear phase characteristics, the fixed delay equalizer 17 must also compensate for phase shifts so introduced.

Figures 3, 4, 5:
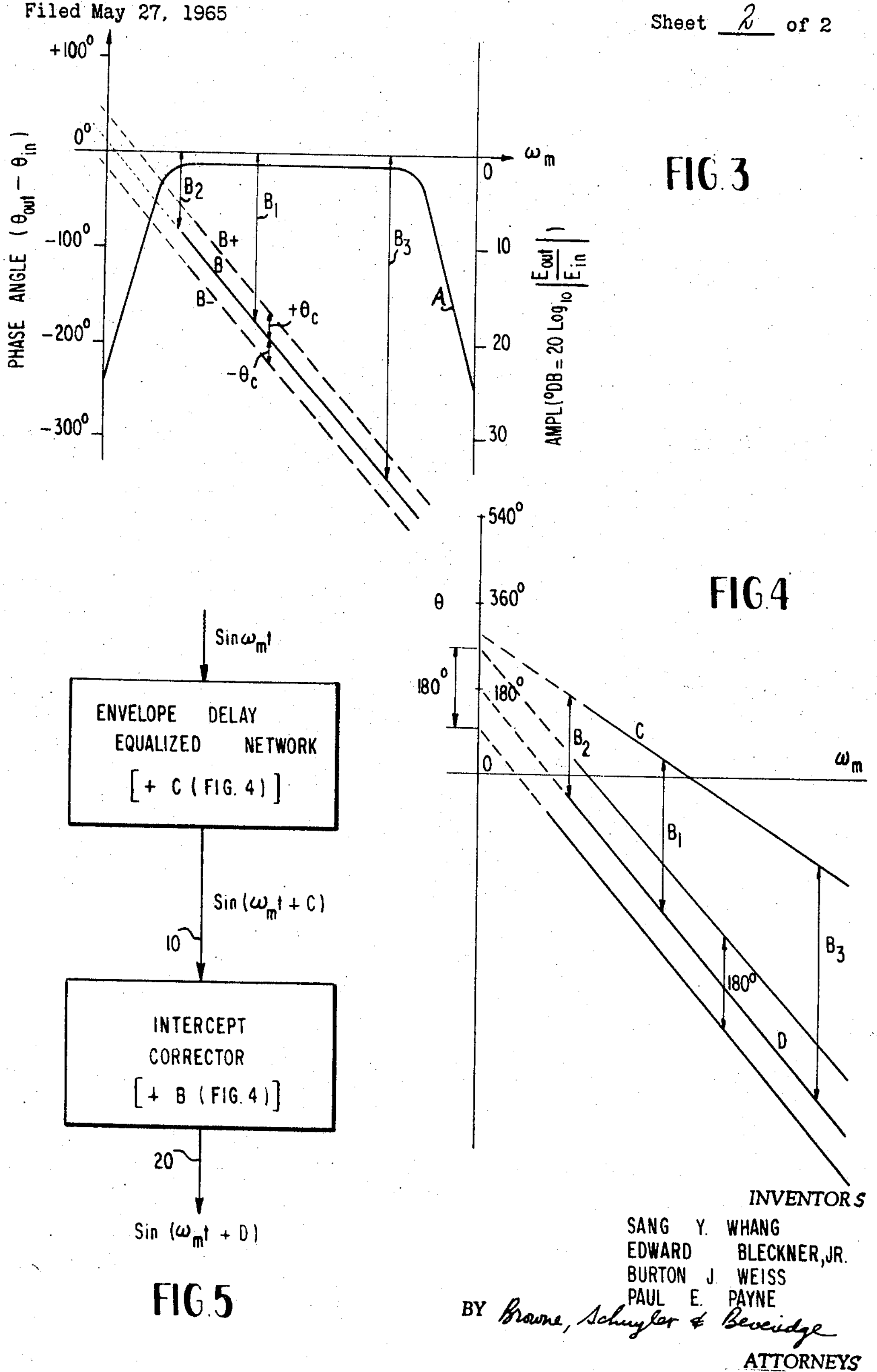
FIG. 3 depicts in one diagram the amplitude and phase characteristics of a typical intercept corrector according to this invention.
FIG. 4 depicts the composite characteristics of an equalized line or network and the intercept corrector.
FIG. 5 is a diagram to illustrate intercept correction according to FIG. 4 in a system as in FIGS. 1 and 2.

A typical amplitude and phase characteristic for an intercept corrector is shown in FIG. 3. Curve A shows an amplitude characteristic and curve B shows the phase characteristic for an intercept corrector. Since the phase angle added to the incoming signal is independent of the frequency of the incoming signal, that is, the same angle $\theta_c$ will be added throughout the frequency range of interest, the curve B will be moved vertically an amount depending upon the magnitude and the sign of $\theta_c$. The range of variability for $\theta_c$ could be made arbitrarily large. However, for the purpose of bringing the zero cycle ordinate intercept to 0°, or any nearest multiple of 180°, the minimum requirement is variability over a 180° span; for example, 0° to 180°, 90° to 270°, −60° to +120°, etc.

In FIG. 4, the straight line C is the linear phase characteristic of an equalized network but having an improper intercept that requires correction. The curve D represents the sum of the network phase characteristics and the intercept-corrector phase characteristic, that is, curve B of FIG. 3 is added to the curve C of FIG. 4 to give curve D. B+ and B− indicate larger or smaller values of B as may be required. It can be seen that the intercept could be adjusted to a multiple of 180°, if the range of the variation of $\theta_c$ is a minimum of 180°. Note that the purpose of this device is to make the composite phase characteristic of the network as corrected by the intercept corrector to be not only linear within the frequency range of interest, but also to have an extrapolated zero cycle ordinate intercept adjusted to 0° or an integral multiple of ±180°.

As illustrated, the invention employs a sine wave in the manner of a carrier wave represented by sin $\omega_c t$, modulated at 13 by a product modulator. It may be noted that a simple free-running multivibrator or the like may be used advantageously in liew of the generator illustratively shown at 11 as having only the sin $\omega t$ output. All harmonics of the designed primary component of a square wave generator would be removed on filtering at 14 and/or 16. Likewise, it will be understood that the input from a source as at 10 may be sin $\omega_m t$, a generally complex wave lying between selected passband limits. Any modulator device having the usual product and sum and difference outputs may be used at 13 and 15, includable in the designation "product modulator," the outputs as shown in FIG. 1 being the requirement, though other outputs may be present up to the point of removal by filtering, to produce an output at 20 which is proportional to the input signal displaced in phase at all frequencies of interest by $\theta_c$; i.e. ∼ sin $(\omega_m t+\theta_c)$. FIG. 2 has indicated therein the feature added by this invention, which may be designated an intercept corrector for a delayed complex wave.

While the invention has been described in terms of particular embodiments, it is not intended that it be so limited except in accordance with the appended claims.

What is claimed is:

1. An electronic device for transmitting a complex wave from which distortions due to amplitude and phase deviations are substantially eliminated, comprising
   - input means providing a signal of multiple frequency components,
   - a generator having an output principally of one frequency,
   - means combining said one frequency and said signal to produce a carrier and sidebands thereabout,
   - means for phase shifting said output by a predetermined phase displacement thereof,
   - said means for phase-shifting output being variable over a phase range of substantially 180° of said carrier,
   - a sideband filter means limiting said output substantially to a single sideband representative of said signal,
   - second combining means responsive to said single sideband and said phase-displacement output to produce a single phase-displaced sideband and a second carrier wave,
   - second filter means for said second combining means passing said sideband of phase-shifted signal and eliminating said second carrier wave, and
   - an envelope delay equalizing network being adjusted to provide a linear phase-frequency characteristic curve extrapolatable to a zero frequency axis at a phase angle differing from 0° only by an integral multiple of 180°.

2. An intercept corrective circuit for a complex signal processing network including an envelope delay network having an output of linear phase characteristic plotted against frequency, comprising
   - means generating a wave of fundamental frequency at least in order of magnitude higher than the frequencies of said signal,
   - means for shifting the phase of a portion of said wave by a predetermined phase angle,
   - said means for shifting phase being variable over a range of substantially 180°, thereby to vary the ordinate intercept of the phase against frequency plot of the envelope delay network output,
   - means combining said signal and an unshifted portion of said wave to produce sideband signals above and below said fundamental frequency,
   - means selecting one said sideband signal,
   - means combining said selected signal with said phase shifted wave to produce a pair of phase shifted signals, and
   - filter means selecting one of said phase shifted signals.

3. A phase altering circuit for adding a predetermined phase angle to a plurality of frequencies within a frequency range of input signals, comprising
   - input means for said signals,
   - generator means for producing a wave having a fundamental frequency substantially higher than said frequency range,
   - combining means responsive to said input and generator means for producing sideband signals corresponding to said input signals above and below said fundamental frequency, means deleting one said sideband, phase-shift means for varying the phase of a portion of the output of said generator means, second combining means responsive to said sideband signal which is not deleted and to said phase-shifted output for producing a further sideband signal corresponding to said input signal being displaced by said predetermined angle throughout said range, said phase-shift means being variable for providing a phase-shift for frequencies in said further sideband altered to cause a curve of phase vs. frequency to extrapolate to 0° or a multiple of 180° for frequencies in said range, and fixed delay equalization means for altering the phase characteristic curve of said further sideband signal.

References Cited

UNITED STATES PATENTS

| | | | |
|---|---|---|---|
| 3,054,073 | 9/1962 | Powers | 333—28 |
| 2,717,956 | 9/1955 | Eglin | 333—28 |
| 1,964,522 | 6/1934 | Lewis | 323—129 |
| 3,017,583 | 1/1962 | Markow | 328—155 |

HERMAN KARL SAALBACH, *Primary Examiner.*

C. BARAFF, *Assistant Examiner.*

U.S. Cl. X.R.

328—177; 333—28